May 5, 1970 R. H. LIVA 3,510,219
OPTICAL ALIGNMENT SYSTEM
Filed Oct. 13, 1966 4 Sheets-Sheet 1

INVENTOR.
ROBERT H. LIVA
BY
ATTORNEYS

May 5, 1970     R. H. LIVA     3,510,219

OPTICAL ALIGNMENT SYSTEM

Filed Oct. 13, 1966     4 Sheets-Sheet 2

INVENTOR.
ROBERT H. LIVA

BY *Stanley Z. Cole*
*B A Cheama*
ATTORNEYS

May 5, 1970 R. H. LIVA 3,510,219
OPTICAL ALIGNMENT SYSTEM
Filed Oct. 13, 1966 4 Sheets-Sheet 3

INVENTOR.
ROBERT H. LIVA
BY Stanley 3 Pole
B. A. Chiame
ATTORNEYS

INVENTOR.
ROBERT H. LIVA

United States Patent Office 3,510,219
Patented May 5, 1970

3,510,219
OPTICAL ALIGNMENT SYSTEM
Robert H. Liva, Rochester, N.Y., assignor to Xerox Corporation, Rochester, N.Y., a corporation of New York
Filed Oct. 13, 1966, Ser. No. 586,487
Int. Cl. G03b 27/32
U.S. Cl. 355—55　　　　　　　　　　　　　　7 Claims

ABSTRACT OF THE DISCLOSURE

An optical system adjustment apparatus which projects focused and magnified images on a fixed image plane. The position of a platen defining the object plane relative to the image plane is established approximately by jack members at the corners thereof and then precisely by fittings movable relative to the jack members until the object plane is correctly aligned in parallel relation to the image plane. A carriage moves a lens member in reciprocating fashion between object and image planes to project a flowing image onto the image plane. The lens member is adjustable axially relative to the carriage by screw members. In addition an eccentric camming device provides fine focus correction of the lens along the optical axis. Tilt angle between the lens member and optical axis is adjustable by sliding mating curved surfaces formed on a lens holder and the carriage. The surfaces are locked in place by a clamping device when the lens member is properly aligned with the optical axis.

---

This invention relates to optical alignment systems and particularly to alignment systems for direct optical path apparatus having a flat optical plane and a single lens mounting.

In a direct optical system, as opposed to a folded system employing mirrors, the only methods of adjusting the optical path are by moving the object or image plane to change the total conjugate of the path or by adjusting the lens to compensate for magnification, focus, tilt, or other deficiencies within the system. In a folded optical system there is the added advantage of having one or more mirrors which may relatively easily be moved, tilted, or rotated to compensate for defects within the optical system. The invention here permits full adjustment of a direct optical system used on an office copier type enlarging and copying device for making 3× enlargements of semi-micro data bearing documents originally reduced by approximately 3×.

An object of this invention is to improve alignment means for a direct optical system. Another object of this invention is to improve platens for maintaining documents as objects to a direct optical system.

Another object of this invention is to provide an improved lens mounting for adjusting a lens of an optical system. Yet another object of this invention is to provide improved apparatus for optically leveling the object plane of an optical system.

Figure 1:
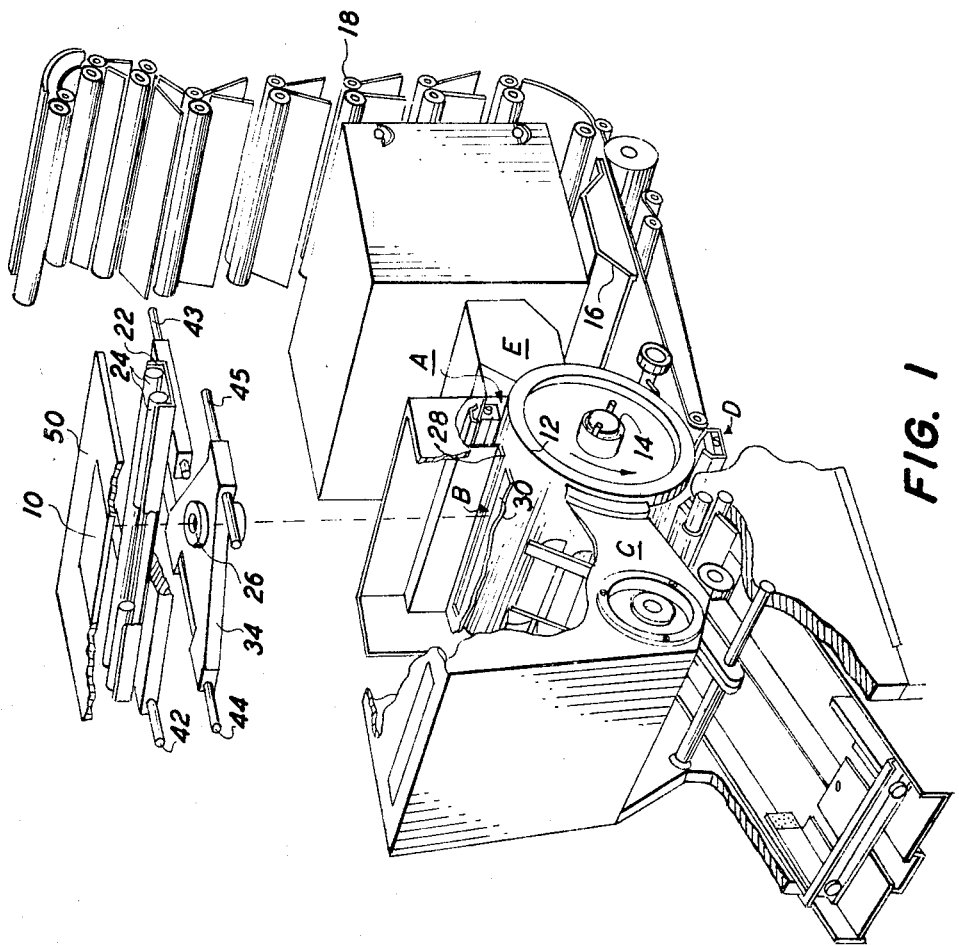
Figure 2:
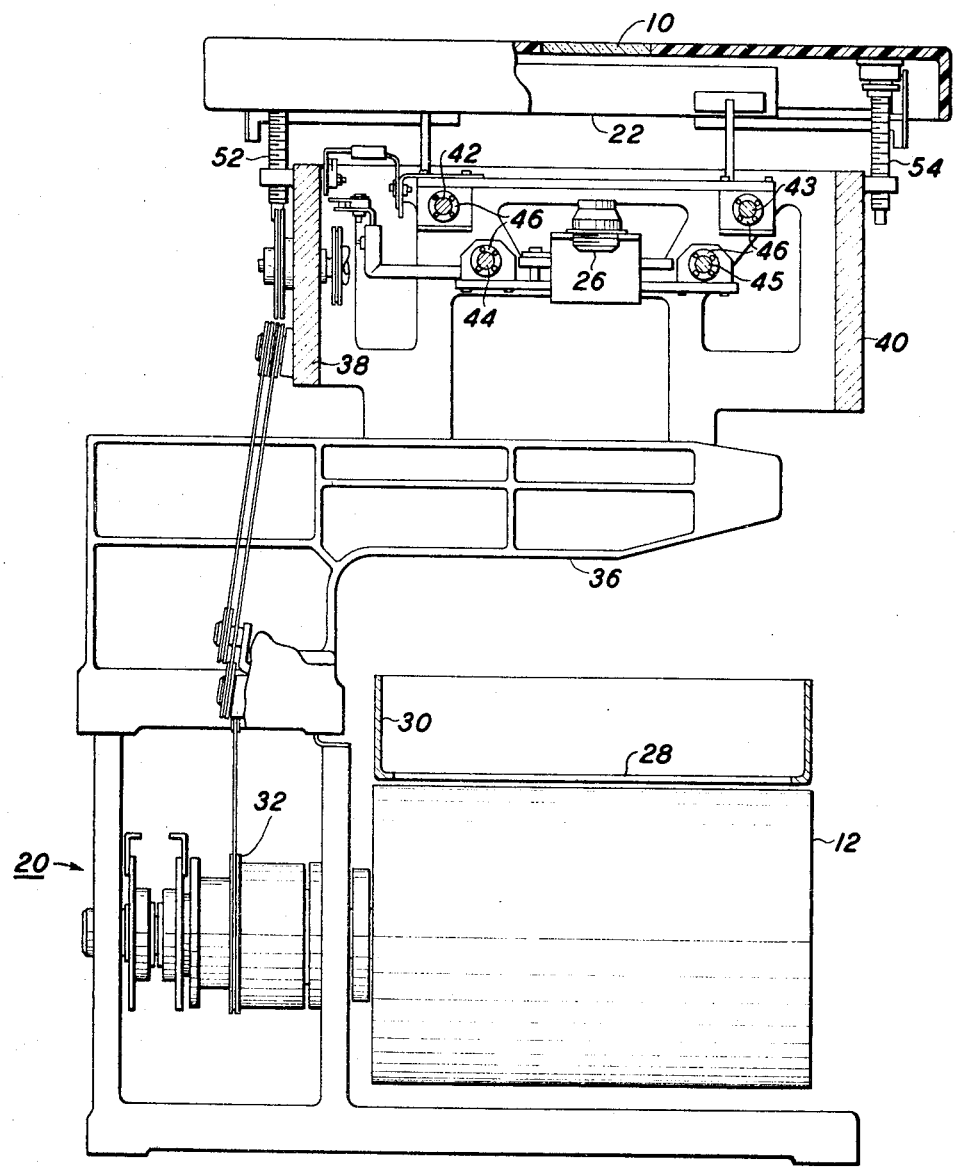
Figure 3:
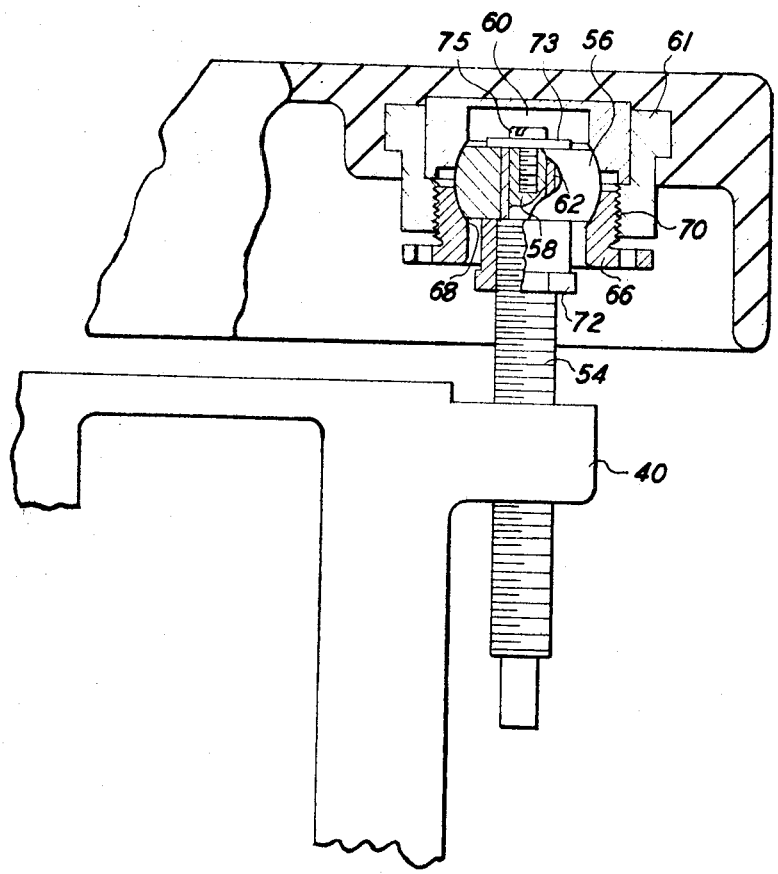
Figure 4:
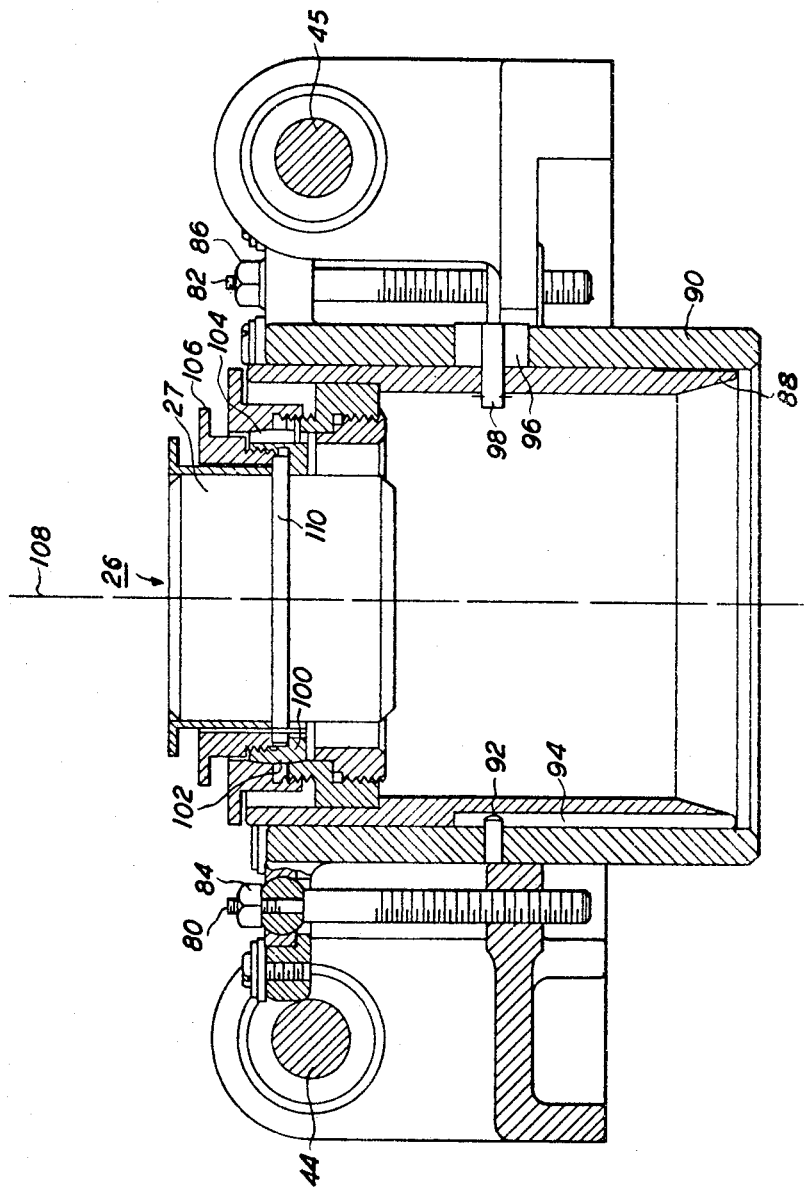

These and other objects of the invention are obtained by means of a multiple jack leveling device for a platen or object plane and a universally adjustable lens mounting to optically align the lens of an optical system. For a better understanding of the invention as well as other objects and further features thereof, reference is had to the following detailed descriptions of the invention to be read in conjunction with the accompanying drawings, wherein:

FIG. 1 is a right-hand perspective view of an office copier apparatus, including an optical scan mechanism, with covers removed and with several parts shown schematically;

FIG. 2 is a front view, partly in section, of the optical apparatus of FIG. 1;
FIG. 3 is a sectional view of a platen leveling jack;
FIG. 4 is a front view, partly in section, of the lens mounting of the optical system.

Referring now to the drawings, there is shown in FIG. 1 a xerographic processing office copier machine, used for producing xerographic reproductions on a stationary original placed on the object plane represented by platen 10. The object placed at the platen is then exposed onto a xerographic image plane formed as a drum 12 and containing a photoconductive layer on a conductive backing. The drum is mounted on a shaft 14 journaled on a suitable frame of the machine to rotate in the direction indicated by the arrow to cause the drum surface sequentially to pass the xerographic processing stations.

For the purpose of the present disclosure, the several xerographic processing stations in the path of movement of the drum surface may be described functionally as follows:

A charging station preferably located as indicated by reference character A at which a uniform electrostatic charge is deposited on the photoconductive layer of the drum.

An exposure station, located preferably as shown by reference character B, at which a light or radiation pattern of copy to be reproduced and supplied by the object placed at the object plane 10 is projected onto the drum surface to dissipate the drum charge in the exposed portions thereof, thereby forming a latent electrostatic image of the copy to be reproduced.

Adjacent to the exposure station is a developing station C whereat the latent electrostatic image is developed by cascading an electrostatic powder over the drum forming a powder image corresponding to the latent electrostatic image on the drum. Next adjacent to the developing station is the image transfer station D where the powder image is electrostatically transferred from the drum surface to a transfer material or support surface. The powder image on the transfer material may be fused thereto by a fuser 16 and then transported through copy transport 18 to a copy holder (not shown).

The final station E is a drum cleaning and discharge station to prepare the drum surface for the next cycle. For a more complete and detailed description of the automatic apparatus referred to schematically above, see copending application Ser. No. 586,477 filed concurrently herewith in the name of D. G. Mallory, et al.

The exposure mechanism is composed of an optical scanning or projection assembly adapted to scan an object at the platen 10 and to project a flowing image of said object onto the surface of the rotating xerographic drum 12. The length of scan of the projection system and the projection of the images onto the surface of the drum in synchronism with the movement of the drum is controlled by a single scan control mechanism generally designated 20 (see FIG. 2).

The scanning of the object at its platen in order to present a latent image ot the xerographic drum of the apparatus is accomplished by means of a movable lens system moved relative to the platen in timed relation to the movement of the xerographic drum. The embodiment shown provides illumination to copy the document placed on the platen 10 by fluorescent lamps held in a suitable carriage 22. When these lamps, in their carriage, are moved to traverse the platen, they provide a uniform illumination of the document to be enlarged and copied by the machine.

The optical system for copying and enlarging data placed at platen 10 comprises scanning lamps 24 held in the scanning carriage 22 to provide a necessary uniform illumination. Scanning in timed relation to the scan lamp 24 and the movement of the xerographic drum 12 is the scan lens 26 suitably mounted in its housing 27. Since this is a direct optical system, there are no mirrors used to bring the object light rays to the exposure slit 28 in the light shield 30 placed above the xerographic drum 12 to prevent exposure from extraneous light or radiation.

Onto the main frame 36 of the apparatus and a suitable frame in front of the machine (this is not shown) are fastened the side plates 38 and 40. The frames and inside plates may be cast as one piece and are adapted to rigidly maintain the lamp support rods 42 and 43 and the lens support lens 44 and 45 which may be bolted or otherwise fastened to said frames by any means such as collars 46.

The cable drive for the optical system is powered by the scan control system 20 and the scan pulley 32 thereon which, through a series of cables and pulleys, cause the illumination carriage 22 and the lens carriage 34 to scan, traversing the object plane of the optical system, in timed relation with the movement of the drum 12 at the image plane. For a more detailed and complete description of a cable system suitable for use herein the copending application Ser. No. 586,477 referred to above.

The direct optical system of the apparatus is adjustable and correctable at the lens mounting 34 which houses the lens 26. However, the first adjustment on the optical system is to insure that the object plane, represented by the platen 10, lies parallel to the drum axis 14 and the exposure slit 28 in the light field 30 under which the flowing image of the object at the platen is put on the drum 12. The platen 10 maintains the object to be copied and is in fact the object plane of the optical system.

The platen 10 is held within a desk plate 50 which may be formed as, for example, a single molded piece made of a plastic or any other suitable material. It has a slot therein where the platen glass 10 is inserted to maintain an object for copying. The entire molded desk 50 is placed on four leveling jacks (two of which are not shown) 52 and 54 all of which are mounted in the side plate frames 38 and 42. One each of the four jacks there is located a ball such as ball 56 (see FIG. 3) which is loosely maintained around a stud extension 58. When the platen desk 50 is placed on the four jacks the balls 56 are self centering into each of the four internally pressed pieces 60. The balls are designed with a slot 62 through their center through which the stud extension 58 passes. The slot 62 is of a larger diameter than the extension of the stud 58 thus permitting lateral movement in relation to the stud extension 58 and the stud or jack 54 itself. When the balls have centered into the pressed piece 60 within the socket 61 which is molded into the platen desk 50, the external nut 66 is tightened on each of the balls through the internal threading of the sockets 61. The canted edge 68 of the external nut 66 tightens the ball against the pressed piece 60 held within the molded desk, the piece 60 also being canted to accept the ball in a wedge-like manner. The external nut 66 is tightened onto the socket 61 at the threaded portions 70 in each. After the four external nuts are tightened, the lock nut 72 on each jack is tightened to bring the jack 54, the washer 73, and ball 56 into immovable intimate contact with each other. A screw 75 screws into the stud extension 58 concentrically therewith, pressing the washer 73 onto the ball 56 to provide a means to press the ball 56 and the lock nut 72 into immovable contact, thereby locking the ball to the jack 54.

The height of the platen above the image plane must be set to insure the proper distance between the two. This is achieved by pre-setting the jacks 52, 54, etc., to the approximate distance required before the desk 50 is placed thereon. After the desk is tightened down, each side is sequentially readied for adjustment in order to level the platen optically with the center line 14 of the drum 12 to insure an equal distance from all points on the object to all respective points of the image such object will form on the drum surface 12 at the exposure slit 28. Each of the four corners must be separately adjusted in order to insure the proper alignment. First a mirrored surface is placed at platen 10 and a source of illumination placed at the slit 28 is reflected therefrom to the mirror on the platen 10 and back to the exposure slit 28 in order to properly align the platen.

The beam of light must be correctly reflected to slit 28. Each of the four corners is separately adjusted to insure the alignment. The external nut 66 is loosened and the jack 54 is turned in relation to the lug 74 thereby raising or lowering the corner of the desk 50. When the corner is properly aligned, the external nut 66 is tightened and the jack is fixed in relation to the lug 74. After the above adjustments are completed for each of the four corners and therefore the object plane will be correctly aligned in a parallel relation to the image plane of the optical system.

The next adjustment feature of the optical system is the proper alignment of the illumination carriage and lens carriage guide rails 42–45. They are squared onto the drum shaft 14 i.e., made parallel thereto and adjusted to eliminate skew between them and the drum shaft. The above is accomplished by placing a reflective surface on the respective guide rails and reflecting an illumination source from slit 28 onto itself in a manner similar to the squaring of the platen. Skew is eliminated by projecting cross-hairs and placing a set of cross-hairs on the reflective surface on the rails. When the cross-hairs align, the rails are not skewed with respect to the drum shaft 14; a priori, the image plane on the drum surface 12.

The next adjustment feature of the optical system is to the lens itself which must be made flat with respect to the drum axis and the slot 28 in light shield 30. Flattening of the plane of the lens 26 of the optical system is accomplished by replacing lens 26 with a mirror in order to reflect a light source made to emanate from the general area of slot 28 in light shield 30 (see FIG. 4). The adjustment is made by turning the three outer screws 80, 82, and a third screw, (not shown). The screws are held in position by nuts 84 and 86 with a matching nut on the third screw. The inner lens mounting 88 is movably fitted in the outer housing 90 whose inner bore is such that it slidably accepts the outer diameter of inner housing 88. The housings are pinned together to prevent movement therebetween by pin 92 held in outer housing 90 and entering inner housing 88 at ridge 94.

The ridge permits axial movement of housing 88 in relation to outer housing 90 while preventing rotation between the two. The fine adjustment of the focus of the lens in the optical system is provided by eccentric 96 which is shafted through both the inner and outer housings of the lens mounting and adapted to permit relative movement therebetween. The eccentric is rotated around an axis common both to itself and shaft 98. Therefore, when the shaft and eccentric are rotated, the eccentric causes the inner housing 88 to move relatively upward or downward with respect to the outer housing 90. What in fact occurs is a movement of the lens 26 relative to the lens carriage 34, therefore, changing its position within the conjugate distance of the optical system.

The movement of the lens within the fixed conjugate distance provides a means for adjustment of the focus of the semi-micro system. When the proper focus is attained, pin 92 is pressed against inner housing 88 locking the inner housing to outer housing 90, within which pin 92 is rigidly held. The lens 26 must be corrected for tilt angle between its axis and that of the optical system. This is accomplished by rotating the lens holder 27 about the vertical optical axis of the optical system. The collar 100 supporting the holder 27 has a convex arcuate surface 102 corresponding to the curvature of the concave arcuate surface of tilt lock 104. Because of this, lock nut 106 and lens housing 27 may be rotated about the optical axis 108 to insure the coincidence of optical axis of the system 108 with that of the central optical axis of the lens 26. Once the tilt angle is eliminated and the axes coincide, the tilt lock 104 is tightened on the threaded surface of inner housing 86 to prevent further rotational movement of lens holder 27 with respect to the optical axis of the system. Lock nut 106 is fastened tight against flange 110, formed as integral part of, or pressed against, lens holder 27 to prevent the latter's movement within inner housing 86.

Once the lens is properly aligned, the mirror may be removed from the holder 27 and the proper lens elements or systems may be placed therein. The optical system is then ready to function in relation to the processing system of the machine in order to make copies of the object placed on top of platen 10 in desk 50.

While the invention has been described with reference to the structure disclosed herein, it is not confined to the details set forth; and this application is intended to cover such modifications or changes as may come within the purpose of the improvement or the scope of the following claims.

What is claimed is:

1. An optical system having an optical axis along which a focused image of an object is directed to a fixed image plane comprising:

support means defining an object plane for holding a document to be projected, means including a plurality of alignment members to mount said support means parallel to the image plane, means to move said alignment members and support means along the optical axis to adjust the planar position of the object plane relative to the image plane, a lens holder having a projection lens therein for presenting an image of the object at the image plane, means to axially move said lens holder along the optical axis whereby said holder is arranged to focus an object on the support means at the image plane, and means for supporting said lens holder for universal tilting about a point lying on said optical axis.

2. The apparatus of claim 1 wherein said support means further includes a plurality of sockets intimately attached to the bottom surface thereof, and said means to mount said support means includes a plurality of self-centering members positioned such that, when said support means is placed on said means to mount same, said plurality of self-centering members will align and coincide with said plurality of sockets.

3. An optical system having an optical axis along which a focused image of an object is directed to a fixed image plane comprising:

support means defining an object plane for holding a document to be projected, means to mount said support means parallel to the image plane, means to move said support means along the optical axis, a lens holder having a projection lens therein for presenting an image of the object at the image plane, means to axially move said lens holder along the optical axis whereby said holder is arranged to focus an object on the support means at the image plane, and means for supporting said lens holder for universal tilting about a point lying on said optical axis, said support means further includes a plurality of sockets intimately attached to the bottom surface thereof, and said means to mount said support means includes a plurality of self-centering members positioned such that, when said support means is placed on said means to mount same, said plurality of self-centering members will align and coincide with said plurality of sockets, said plurality of self-centering members having further associated therewith clamping means for bringing said plurality of sockets into intimate and immovable contact with said members, said members being in fixed relation to the image plane of said optical system whereby when said object support means is clamped to said self-centering members it is fixedly maintained in relation to the image plane.

4. The apparatus of claim 1, wherein said means to axially move said lens holder has associated therewith a frame, said means to axially move said lens holder being housed within said frame and said means for supporting and universally tilting said lens holder being positioned between said means to axially move said lens holder.

5. The apparatus of claim 1 wherein said means to axially move said lens holder is adapted to achieve coarse and fine focusing and comprises:

a first member adapted to be moved axially along the optical axis, a second member slidably positioned within said first member, means to move said first member axially along said optical axis for positioning the lens for initial, coarse focusing of the object onto the image plane, and means to move said second member axially, relative to said first member for adjusting fine focusing of the lens to present a sharp image of the object at the object plane at the image plane.

6. Optical alignment apparatus comprising:

support means defining a first plane, means to mount said support means optically parallel to a predetermined second plane, means to move said support means perpendicular to the first plane which is defined thereby, a lens holder adapted to house a lens therein for projecting image light rays between the first and second planes, means to move said lens holder along an axis between the first and second planes, said axis being coincident with the optical axis produced when a lens is positioned in the lens holder, means for supporting said lens holder for universal tilting about a point on said axis such that, when a lens is housed within said lens holder, said alignment apparatus is adjustable to present a focused image from one of said planes to the other, and drive means for moving said lens holder in reciprocating fashion parallel to said first and second planes to project a flowing image between said planes.

7. Apparatus according to claim 6 wherein said means to move the lens holder comprises:

a first member movable axially along the optical axis for coarse focusing with the optical imaging system, a second member slotably positioned within said first member, means to move said second member axially relative to said first member for adjusting fine focusing of the lens.

References Cited

UNITED STATES PATENTS 2,285,768  6/1942  Drucker _____ 95—50
2,368,970  2/1945  Cook.
2,603,125  7/1952  Evers.

NORTON ANSHER, Primary Examiner

R. A. WINTERCORN, Assistant Examiner

U.S. Cl. X.R.

350—24.7, 252; 353—101; 355—63